UNITED STATES PATENT OFFICE.

HUGH EDWARD PLUNKETT, OF MEDFORD, MASSACHUSETTS, ASSIGNOR TO JAMES BARRY, OF BOSTON, MASSACHUSETTS.

MANUFACTURE OF PURIFIED BANANA-FLOUR.

1,053,955.     Specification of Letters Patent.     Patented Feb. 18, 1913.

No Drawing.     Application filed May 1, 1912. Serial No. 694,558.

*To all whom it may concern:*

Be it known that I, HUGH EDWARD PLUNKETT, now of 51 Spring street, in the city of Medford, in the county of Middlesex and State of Massachusetts, have invented a certain new and useful Manufacture of Purified Banana-Flour, of which the following is a specification.

This invention has for its chief object to convert the bodies or peeled pulp of green bananas into a practically white dry flour suitable for food, the flour purified or in other words free from the discoloration caused by the so-called "stain" which is a fluid permeating the pulp. This fluid decomposes and imparts a dark color to flour made from dried banana bodies if allowed to remain until the pulp has been dried preparatory to grinding.

My invention relates to the removal of this stain from the pulp, before drying and grinding the same, and consists in the stain removing or purifying process hereinafter described and in the purified green banana flour as an article of manufacture.

I peel the green or partly ripe bananas and place the same in a tank containing a sufficient quantity of brine of suitable purity and strength to cover the bodies, and set the water in rapid motion in such a manner as to cause it to move in contact with the surfaces of the bodies. The movement of the water is preferably caused by forcing the air under pressure into the tank in such manner as to set up a rapid circulation of the water. The moving water while carrying with it the banana bodies, moves more rapidly than the latter, and therefore continuously flows over and washes their surfaces, thus causing a gradual and complete withdrawal of the staining liquid. The washing of the bodies is continued until the brine is discolored by the stain. Fresh brine is then substituted for the discolored brine, and the washing of the bodies and the changing of the brine is continued until the discoloration of the brine ceases. The same result may be produced by causing brine in any other suitable way to flow continuously over the bodies and in contact with practically all parts of the surfaces thereof, until the stain is withdrawn. For example the bodies may be held in the path of a falling stream of brine which flows in contact with their surfaces, or the bodies may be moved in a body of water in which they are submerged. In any case there must be a practically continuous contact of water with the surfaces of the bodies, the water moving relatively to the bodies, so that it sweeps their surfaces and causes an outward movement of the stain from the internal portions to the surfaces of the bodies, the stain being washed continuously from the bodies until the discoloration of the brine ceases. When the stain has been removed the bodies are washed in fresh water in a similar manner to the washing in brine. This is done for the purpose of removing the brine from the bodies, and the water is changed and the washing continued until the salt is removed from the bodies. This process leaves the bodies perfectly white and clean. After the final washing the bodies are placed on a perforated board or table or other material suitably perforated, and an air hose is then used, and all the water is blown from the surface of the banana bodies, with it preparatory to drying. The bodies are then dried in an evaporator or kiln, after which they are ground into flour by any suitable milling mechanism adapted for grinding cereals or other dry products.

The flour thus produced has the natural color of the banana bodies and is practically white when the bodies are ground before ripening has commenced, and has a slight cream color when the bodies have been slightly ripened. Fully ripe banana bodies cannot be ground into dry flour, because of the large percentage of sugar they contain. Green banana bodies, or those which have ripened so little that they do not contain a sufficient percentage of sugar to prevent grinding, are suitable for the manufacture of flour.

Green banana flour has hitherto been produced without removing the stain from the bodies before drying and grinding. Such flour has a dark color due to the stain in the bodies and is not therefore marketable as an article of food for human beings, although used to some extent as human food and as a cattle food. The purified banana flour which I produce is a suitable and valuable food for infants. It may be used alone or mixed with other ingredients. It is also suitable for the manufacture of a bread. The flour may be used either alone or blended with other ingredients (as a substitute for wheat flour or flour made from other cereals) in making various articles of food or drink.

I claim:

1. The method of purifying banana bodies, the same consisting in continuously subjecting the surfaces of the bodies to contact with brine, moving relatively to and over the said surfaces, and thereby removing the staining liquid contained in the said bodies; then washing in fresh water in a similar manner to the washing with brine, and thereby removing the salt from the said bodies.

2. The method of making green banana flour which consists in removing the skin from the green banana bodies then purifying these bodies with brine to remove the staining liquid therefrom, then washing the bodies with water to remove the salt therefrom, and then drying and grinding the purified bodies into flour.

3. As an article of manufacture purified green banana flour free from staining ingredients having the natural color of the body (after separation from the skin) of the fruit before such fruit has ripened.

In testimony whereof I have affixed my signature, in presence of two witnesses.

HUGH EDWARD PLUNKETT.

Witnesses:
GEORGE M. NAY,
EDWARD N. CARPENTER.